Patented July 5, 1932

1,866,433

UNITED STATES PATENT OFFICE

ABRAHAM W. WARD, OF SAN FRANCISCO, CALIFORNIA

SURGICAL AND DENTAL PACK COMPOSITIONS AND METHOD OF APPLYING THE SAME

No Drawing.   Application filed April 8, 1930.   Serial No. 442,686.

This invention relates to dental cement compositions capable of being used as surgical dressings, particularly useful after pyorrhea surgery and as linings for dentures and as an impression material, as well as for temporary stopping in teeth or filling material and as temporary crowns and the like; and to methods of applying the same.

A great number of temporary cements which include zinc oxide as the basic constituent thereof have been heretofore proposed, none of which are suited for use as packs or surgical dressings in pyorrhea, or as linings for dentures, impression material and like purposes. Many of such compositions are of questionable merit even for use as temporary stopping in teeth for the reason that they are too easily dislodged from the cavity and they are entirely unsuited as surgical dressing after pyorrhea surgery, as linings on dentures or as impression material and to my best knowledge have never been proposed for such purposes. The addition of the binder to the zinc oxide preparation has a distinct advantage and this application is based on that advantage and original methods of employing it.

Temporary gutta percha another material used for temporary stopping is not entirely satisfactory because it is too soft to resist the stress of mastication and is too easily forced out of the cavity. Also, because gutta percha is a vegetable base, porous and absorbent food particles and saliva are forced into the mass where they undergo rapid decomposition forming lactic acid which is highly irritating to the exposed dentine. Temporary cements, oxyphosphates of zinc and oxychlorid of zinc are not well suited for temporary fillings because of their irritating properties to dentine and gum tissue and also because of their difficulty of application, undercuts being necessary to hold them in place, and because of their difficulty of removal.

I have discovered that the disadvantages of prior compositions as temporary stopping in teeth may be overcome and their usefulness extended by providing novel compositions in which substances resistant to the action of the fluids in the mouth and which act as binders are incorporated, giving properties of plasticity and coherence thereto without destroying the adhesive properties thereof. A substance which I have discovered to be satisfactory as such a binder is a material of mineral origin such as asbestos. The inclusion of such substances in compositions in the manner hereinafter set forth enables them to be formed into a homogenous unitary mass that will pack readily, adhere in a tooth cavity without the necessity of undercutting the tooth surfaces, and is readily removable as a unit. In addition my improved compositions may be used for the formation of temporary crowns and the incorporation of such a binding substance gives the composition novel characteristics of plasticity that permit it to be used as very effective surgical dressings after pyorrhea surgery and to be used as linings for dentures so that they may be worn immediately following extractions, while its properties of tack, adhesion and hard setting qualities at a slow pace are such as to provide an improved impression material which gives an accurate and sharp impression. These qualities provide also a temporary rebase which will remain in position over a substantial period of time while permitting ready removal and reapplication thereof assuring a good fitting denture which is both economical and beneficial to the patient preserving the tissues under the denture in splendid condition.

My improved compositions used after pyorrhea surgery as oral surgical dressings as a lining for dentures, impression material and as temporary stoppings for teeth and the like, do not decompose in the mouth. Even if left in the mouth for a long time, said compositions will remain sweet and entirely free of the odor so typical of gauze packings left in the mouth over night. This characteristic of my improved compositions to resist decomposition by the fluids of the mouth does not depend upon the strength of its antiseptics, which are harmless to the tissues but in the manner in which it acts. It sets hard shortly after coming in contact with the blood or saliva, forming a mass impervious to the fluids of the mouth which, so readily permeate and decompose gauze packings.

Accordingly, an object of the invention is to provide a temporary stopping and filling composition, and surgical dressing that is easily applied, and is resistant to the action of fluids in the mouth, and to provide novel methods of applying the same.

Another object of my present invention is to provide dental compositions having all the advantages of prior temporary stoppings and temporary cements that are easily applied, set hard, stay in place, are non-absorbent, non-irritating, remain antiseptic, are sedative and are easily removed.

Still another object of my invention is to provide novel compositions for lining dentures so that they may be worn immediately following extractions with a minimum of pain and discomfort, and novel methods of applying the same whereby the wounds and palatal surfaces are covered with an antiseptic cement that allays pain and soreness, controls hemorrhage, prevents infection and promotes healing.

A further object of the invention is to provide a dental surgical dressing useful as a filling composition and cement that does not set too quickly, inhibits the growth of bacteria, and promotes healing.

A still further object of the invention is to provide a temporary stopping and surgical dressing composition that is easily mixed, is readily manipulated, is plastic, adhesive, cohesive, a non-irritant and aseptic, and may be applied with or without the use of heat.

Other and further objects of the invention will appear from the description hereinafter set forth. It is to be understood, however, that various changes in the properties of the several ingredients may be resorted to and that chemical equivalents may be employed without departing from the spirit of the present invention.

In the preferred form of my improved composition, a basic metallic oxide such as zinc oxide is mixed with a natural gum in finely divided or powdered form. Other gums may be used such as gum damar, gum copal, gum kauri, gum Manilla, etc. However, I prefer to employ the gum resin obtained from the exudation of pine trees. The zinc oxide and resin are mixed preferably in approximately the proportions of 2 parts of the oxide to 1 part of resin. A binder such as a mineral substance, for example asbestos, preferably in a finely divided or nearly powdered condition, is then added to the zinc oxide-resin mixture during the manufacture and thoroughly mixed with and disseminated therethrough. The amount of asbestos employed is variable depending upon the consistency of the mixture desired, and is preferably in the approximate proportion of one ounce of asbestos fibre to one pound of the zinc-resin mixture.

For certain purposes such as the treatment of severe cases of Vincent's angina silver iodide may be mixed with the zinc-resin-asbestos mixture by the dentist in the manner and proportions hereinafter set forth.

A liquid mass containing the ingredients which when combined with the zinc oxide resin mixture will form my improved composition is separately prepared. In forming this liquid mass, a solvent for the resin such as oil of cloves, oil of juniper berry, cinnamon oil, oil of wintergreen, turpentine and the like, is mixed with a material capable of delaying the setting time of the cement and of substantially eliminating the pungency of the solvent oil. The material which may be employed for this purpose is vegetable oil such as olive oil, cotton seed oil, china nut oil, peanut oil, or linseed oil or combinations thereof. It is preferred to use oil of cloves as the solvent with some turpentine added to reduce its pungency, and olive oil as as the vegetable oil. The oil of cloves with turpentine when used, and olive oil are combined or mixed together in the approximate ratio of 2 parts of oil of cloves to 1 part of olive oil. The turpentine is not essential but improves the product by reducing the pungency of the oil of cloves, the amount of turpentine used being dependent upon the reduction of pungency desired.

To this olive oil-oil of cloves mixture is next added a substance which is capable of inhibiting the growth of bacteria. An aniline dye such as scarlet red possesses this desired property and also colors the mass. The amount of scarlet red added to the mass is about ½ to 1% of the total volume of the olive oil-oil of cloves mixture. It is to be understood that while scarlet red is preferred other aniline dyes may also be employed.

My improved zinc oxide-resin-asbestos powder and the improved liquid composition to be mixed therewith are packed and sold in separate containers and are mixed as needed and applied as closely as possible in accordance with the methods hereinafter set forth, although it is to be understood that wide variations in the preferred technique of application of my improved compositions may be made without departing from the spirit of my invention.

The use of my improved compositions makes the surgical eradication of pyorrhea a practical, safe and successful procedure. Properly mixed and correctly applied substantially in accordance with the preferred technique hereinafter set forth my improved compositions prove very efficient in overcoming post operative pain, infection and hemorrhage, the greatest obstacles to pyorrhea surgery. Said compositions seal the wounds from contact with infecting and irritating substances and protect the blood clots during the process of regeneration, meanwhile serving as an antiseptic and sedative treatment, desensitizing cementum and promoting healing.

For use after pyorrhea surgery the following preferred procedure should be followed as closely as the case treated will permit. Mix my improved powder and liquid compositions thickly on a sterile pad with a sterile spatula. Apply the pack formed in this way into the approximal spaces preferably with a sickle-shaped instrument. The approximal spaces are first filled, care being taken to pack toward the contact points so as not to dislodge the blood clots. Force the pack through to the lingual surfaces and work it around the lingual, labial and buccal surfaces, entirely covering the operated areas. The pack is smoothed and molded into place with the cheek and lips, the patient assisting with the tongue. The surfaces where the pack is applied should be covered with blood, but too large a clot will interfere and should be removed before applying the pack. It is essential that the pack extend through to the lingual surfaces so as to lock it in place. Leave said pack in place 10 to 14 days, or until the alveolus is entirely covered with new soft tissue. If the packing is removed before healing is complete, new tissue is carried away and healing is unnecessarily delayed. One application is generally sufficient, but should any portion of the pack become dislodged or should the alveolus not be entirely covered with new tissue apply a new pack. In places where very deep pockets existed, it is advisable to pack these pockets for a period of two or three months to prevent any superfluous tissue from growing up and forming new pockets. The pack should be mixed thick and packed into these cavities, the packing being changed once a month or oftener if required.

My improved compositions are especially useful in Prosthodontia, that branch of dentistry which treats with artificial dentures when applied in accordance with my improved methods hereinafter set forth. Through the use of my improved compositions dentures constructed from impressions taken before, can be worn immediately following extraction with the minimum of pain or discomfort. By providing my improved dentures, patients are no longer embarressed from being without teeth, suffer no discomfort caused by loose dentures, and are not indisposed as usually occurs following extractions and new dentures. They learn easily how to wear dentures, and there is no delay between extractions and dentures. The wounds and palatal surface of the denture are covered with an antiseptic cement which allays pain and soreness, prevents infection, controls hemorrhage and promotes healing, and is easily removed and replaced to compensate for loss by absorption, thus assuring tight fitting dentures at all times.

My improved compositions are pliable when soft, and set slowly except when in direct contact with moisture, but hold together so that when set they retain all of the sharp outlines giving an accurate impression and fit not possible with any other material and give the dentist ample time for manipulation. They do not stretch the tissues, allow a better muscle trim, lessen the probability of overextension, do not adhere to the tissues, facilitate the taking of impressions, and give the sharpest and best impressions.

In the preparation and application of my improved compositions on dentures the following preliminary steps are necessary. Before extracting the teeth, good plaster or compound compressions should be secured and the teeth selected to secure accurate bite. The models should be trimmed in anterior region, first bicuspid to first bicuspid, one tooth area at a time. That is, the central incisor should be cut off, the porcelain fitted into the space, and the plaster trimmed on the labial surface. The alveolus should be trimmed sufficiently to accommodate for thickness of artificial gum. It is best not to trim too much because my improved compositions will compensate for any space. The fitting should proceed with each tooth as directed for the central incisor carving model. The denture or dentures should be finished in the manner set forth in readiness for the extraction sitting.

For temporary dentures mix my improved powder and liquid compositions thick but soft enough so the pack will spread under pressure. After the teeth have been extracted and the mouth surgically prepared for dentures, place the denture prepared as above set forth in the mouth to ascertain if there is any overextension. The flanges should be too low rather than too high. Place my improved mixture on the denture covering all surfaces except the high position of the vault, to a thickness of about one-fourth an inch. Insert the denture in mouth and instruct patient to bite and hold lips together, then swallow four times holding teeth together. Allow about two minutes in this position; take hold of cheeks on either side and move with a circular motion; then pull upper lips down and lower lips up to trim frenum. Have the patient remain in the chair with case in the mouth under steady pressure for about ten or fifteen minutes, then test the pack with an instrument to see if it is sufficiently hard. To hasten setting, if necessary, have the patient rinse mouth with warm water.

The patient should return daily for postoperative treatment. Very often, due to the puffing of the tissues from the local anæsthetic, the denture will be very loose the day after insertion. In such cases it is advisable to remove all of my improved composition from the denture and to repack or put a roll of pack from the bicuspid region posteriorly to the heels and over about four millimeters of the palate posteriorly and to have the patient bite gently to place. All cases should be repacked seven to ten days after extraction and from then on according to the amount of absorption and loss of pack by chipping.

My improved compositions are hard self-cleansing substances when set and the patient should be told not to brush the denture on the side of the pack. A slow stream of cold water will wash away any débris. The vulcanite and teeth may be brushed in the regular way.

The sharpest and most accurate impressions for new dentures can be taken with my improved compositions by using patient's old denture as a tray. Impressions of my improved compositions are not taken under stress, as my improved compositions set in about ten minutes, during which time the mouth is bound to fall into the natural position.

For denture impressions mix my improved powder and liquid thick but soft enough to spread under pressure, fill the denture with the mixture covering all surfaces except high position of vault to thickness of one-quarter inch, insert the denture in the mouth and instruct patient to go through usual motions. Have patient remain in chair with the case in the mouth under steady pressure for ten minutes. Remove the denture, trim away excess postdam and place my improved composition mixed thick about the periphery; place the denture again in the mouth and have patient bite firmly into place. To hasten setting, if necessary, have patient rinse mouth with warm water. Run the model leaving my improved compositions in place and return to the patient to wear until new denture is completed. At that time the tissues under the old denture will be found to be in splendid condition due to the healing properties of my improved compositions and the absence of irritation caused by loose dentures.

My improved compositions are highly desirable for temporary rebasing of dentures. Very frequently when a client comes in with a loose denture it would be inadvisable to permanently rebase the denture for fear of further absorption and additional cost. A temporary rebase of my improved compositions can be easily applied, removed and re-applied to compensate for loss by absorption. A denture rebased with my improved compositions will give months of service, the cost is comparatively small, the tissues are kept in spendid condition, and the patient is assured of excellent fit when it is advisable to construct permanent dentures.

For temporary rebasing, mix and apply my improved compositions in the same manner as for temporary dentures. When the permanent rebase is desired, take the impression as above set forth, run the model, remove my improved compositions from the denture and rebase with vulcanite.

After extractions, if the socket has been carefully prepared and my improved compositions properly mixed and applied, the beneficial effect is apparent by the absence of pain, odor and soreness. My improved compositions set hard shortly after coming in contact with the blood and act as a splint to support the blood clot, meanwhile keeping the socket fresh and clean, and promoting healing by preventing the ingress of infecting and irritating substance which delay healing. Unlike gauze packings, my improved compositions do not decompose in the mouth.

For use after extractions, before applying my improved pack, smooth all rough and sharp spicules of bone around the edge of the socket with bone hoes, care being taken that no small particles of bone remain in the socket. Especial attention should be given to any pathology that may remain at the apical region or along the sides of the bone cavity. Soft growths can usually be removed with small size spoon curettes, or if the socket is too small, the approximal curettes will be found very efficient. The pericementomas surrounding the root surfaces in teeth affected with pyorrhea often cling with great tenacity to the socket walls, but they are readily detached with the approximal curettes. When all pathology and particles of bone have been removed, allow the socket to fill with blood. Mix my improved powder and liquid composition thin on a pad. Then take a piece of sterile gauze about one half the width of the socket and one third longer than the depth of the socket and work this gauze into the mix, thoroughly saturating the gauze with the mixture. The gauze is then applied with pliers into the socket through the blood to rest lightly on the base of the socket, the surplus remaining on the top of the socket. The gauze should not be packed tight and should be left in place three to five days. So far as I am aware I am the first to discover the advantage of application of gauze saturated with such compositions in the treatment of sockets after extractions and this method of treatment forms an important part of my invention.

My improved compositions properly applied over-come one of the most troublesome problems the dentist has to deal with, namely, the dry socket. The dry socket is one in which the initial blood clot has been lost due to breaking down by infection or by being washed out with too vigorous irrigation. Pain is always present as well as the characteristic odor in such cases. To treat dry sockets, fill the socket with normal salt solution or other mild antiseptic to take the place of blood. Mix and apply my improved compositions in the manner above set forth for use after extractions, and pain will usually cease immediately. The plug so formed should be left in place six days. It may be necessary to repack, in which case repeat the procedure above set forth and leave pack in place three days. The socket should be filled with normal salt solution before applying my improved compositions to prevent contact thereof with the dry bone, and the gauze should not be packed tight.

My improved compositions are a splendid aid in the treatment of Vincent's angina or trench mouth, sealing the ulcerated surfaces from contact with infecting and irritating substances, and acting as a constant, antiseptic, sedative treatment. My improved method of treating Vincent's angina, comprises first spraying all ulcerated surfaces and under and around loose edges of gum with a solution of one part hydrogen peroxide and four parts hot water in a spray bottle, about two and one half ounces, to which three drops of tincture green soap should be added. Apply saturated solution of chromic acid all over the lesions with a toothpick or suitable non-corrosive instrument. Mix my improved compositions very thick on a pad and pack the same as in pyorrhea surgery. Leave packing in place four days. Remove packing, apply chromic acid solution and repack. Repeat this procedure until infection subsides. In the meantime, prescribe saturated solution of Bel-Dent powder or other suitable substance to use as a mouth wash three or four times a day.

In severe cases of Vincent's angina treat as above, but before applying my improved composition, mix one part of silver iodide powder with three parts of my improved powder and mix this combination with my improved liquid and pack as indicated after pyorrhea surgery. If pyorrhea pockets are present, after acute infection has subsided, eradicate surgically and apply as for pyorrhea surgery.

For temporary stopping in teeth mix my improved powder and liquid composition very thick and apply freely into the tooth cavity with cotton pliers or a suitable instrument. Have the patient bite and trim with a hot instrument which sets pack immediately. It is not necessary to use hot instruments unless desired, as said mixture will set hard in a few minutes after coming in contact with the saliva. Said mixture being of a tenacious nature, will remain in place, but it is readily removed usually enmasse, with a suitable sharp pointed instrument.

For temporary crowns mix and apply powder and liquid as set forth for temporary stopping. Extend the mixture over and around the tooth and smooth with spatula, hot or cold as preferred. Crowns formed of my improved composition can be trimmed or built up as desired, making a very efficient protection that will stay in place, remain antiseptic and keep the cavity obtunded.

The same features that make my improved composition such an efficient temporary stopping for cavities make it equally effective as temporary cement for inlays and bridges. Inlays and bridges cemented with said compositions will set in a few minutes, during which time it is advisable to hold the pressure.

For all purposes, except when used on gauze after extractions and for cementing inlays and bridges, etc., temporarily, my improved powder and liquid compositions must be mixed thick. The powder must be permeated with the liquid and thoroughly mixed, adding powder as required to give it the correct body. It is very important that care and time be given to the mixing operation, otherwise the best results may not be obtained. To make a thick mixture use about 15 drops of liquid to a heaping spatula of powder, or in like proportion to requirements, placed on the opposite sides of the pad. Then use about one third of the powder to cover the liquid and mix. As the powder is absorbed by the liquid gradually add more powder until the mix has the correct body to facilitate its use as directed.

It is to be noted that the temporary cement made in accordance with this invention is easy to mix and easy to apply. It stays in place, and remains antiseptic for long periods of time. Even if left in the mouth for a long time, it will remain sweet and entirely free of odor, due to the fact that it is resistant to the decomposing action of the fluids of the mouth.

Having described preferred forms of my improved composition and methods of manufacture, preferred methods of use for various purposes, it will be understood by those skilled in the art that wide variations may be made from the foregoing detailed disclosures without departing from the spirit of my invention as set forth in the terms of the appended claims. Accordingly what is desired to be secured by Letters Patent of the United States and is claimed as new is:—

1. A dental composition comprising a basic metallic oxide and a natural gum, a solvent for said gum for bringing said basic metallic oxide and said gum into intimate association, asbestos disposed throughout the oxide-gum-solvent mixture to give the same mechanical strength, and being present in said composition in the proportion of substantially one part of asbestos to sixteen parts of the oxide-gum mixture, and a vegetable oil capable of delaying the setting of said composition incorporated therein.

2. A dental composition comprising a basic metallic oxide and a natural gum, a solvent for said gum for bringing said basic metallic oxide and gum into intimate association, asbestos disposed throughout the oxide-gum-solvent mixture to give the same mechanical strength, and being present therein substantially in the proportion of one part of asbestos to sixteen parts of the oxide-gum mixture, and a vegetable oil capable of delaying the setting of said composition incorporated therein, said vegetable oil comprising olive oil.

In testimony whereof I affix my signature.

ABRAHAM W. WARD.